United States Patent [19]

Meyer

[11] Patent Number: 4,907,812
[45] Date of Patent: Mar. 13, 1990

[54] BI-DIRECTIONAL UNSUPPORTED AREA SEAL

[75] Inventor: Danny S. Meyer, Richmond, Tex.

[73] Assignee: Cooper Industries Inc., Houston, Tex.

[21] Appl. No.: 915,589

[22] Filed: Oct. 6, 1986

[51] Int. Cl.⁴ ............................................. F16J 15/20
[52] U.S. Cl. .................................... 277/117; 277/102;
277/166; 277/123; 277/125; 277/188 R;
277/193
[58] Field of Search ............... 277/117, 123, 129, 102,
277/190.31, 125, 188 R, 193

[56] References Cited

U.S. PATENT DOCUMENTS

| 2,610,689 | 9/1952 | Eckel | 277/190 X |
| 4,262,690 | 4/1981 | Binegar | 277/123 X |
| 4,349,205 | 9/1982 | McGee et al. | 277/117 X |
| 4,384,726 | 5/1983 | Meyer | 277/117 X |

Primary Examiner—Allan N. Shoap
Attorney, Agent, or Firm—Eddie E. Scott; Alan R. Thiele

[57] ABSTRACT

A fluid pressure sealing assembly 40 adapted for bi-directional sealing of the annulus between two coaxially disposed cylindrical surfaces 16, 48 and including a stack of packing rings 41 sandwiched between a pair of retainer rings 43, 45. The packing assembly is held together by a plurality of pins 80, each of which extends through aligned openings in the packing rings 41 and into blind bores 81, 82 in the respective retainer rings 43, 45 on both sides of the packing rings. The surface of a retainer ring at each end of the sealing assembly 40 which is to be exposed to fluid pressure in the annulus is of greater area than the surface contact area of the adjacent packing ring 41 contacting the retainer ring because of the cross-sectional area of the pin holes so that the force which is transmitted to the packing rings from a retainer ring is amplified and increases the packing and sealing effect of the packing rings. Means 53 for mechanically applying a pre-load to the sealing assembly 40 may also be included.

4 Claims, 1 Drawing Sheet

BI-DIRECTIONAL UNSUPPORTED AREA SEAL

BACKGROUND OF THE INVENTION

This invention relates generally to a packing or seal assembly for sealing the annulus between the side wall of a hollow cylindrical member and the outside wall of a second cylindrical member disposed concentrically therein, and more particularly, to a pressure energizeable seal assembly having capability for bi-directional sealing in both axial directions.

The seal assembly of this application is intended for use in sealing applications where bi-directional sealing is essential as in spool type valves, crossover seals in wellhead assemblies, or sub-sea applications. Pressure energized seals wherein sealing capability is enhanced with increasing pressures are well known as are bi-directional seal assemblies.

Seal assemblies which utilize the principle of concentrating the total force of fluid pressure acting on the seal assembly to a smaller area of sealing surface and thereby amplifying the compressing force and sealing effect of the sealing surface are also known. One such "unsupported area" seal, as these seal assemblies are sometimes referred to, is shown in U.S. Pat. No. 4,262,690. However, the seal shown therein is uni-directional in that it is adapted to seal in only one axial direction of application of fluid pressure.

It is therefore an object of the present invention to provide a pressure energizeable sealing assembly for sealing an annulus between two cylindrical objects for either axial direction of application of fluid pressure.

It is another object to provide a pressure energizeable sealing assembly for sealing an annulus between two cylindrical surfaces wherein the sealing assembly comprises a plurality of contiguous packing rings sandwiched between a pair of retainer rings and the surface of a retainer ring adapted to be exposed to fluid pressure is of larger surface area than the surface of the adjacent packing ring which is exposed to the retainer ring whereby the fluid force applied to the retainer ring and sealing assembly from either axial direction and which is transmitted to the packing rings is amplified to increase the compression and sealing effect of the packing rings.

SUMMARY OF THE INVENTION

The present invention is directed to a fluid pressure sealing assembly which is adapted for bi-directional sealing of the annulus between two coaxially disposed cylindrical surfaces as a crossover seal between a well casing and tubing head or as a seal between the valve stem and valve body of a spool valve. The sealing assembly includes a stack of plastic or elastomer packing rings which are sandwiched between a pair of retainer rings. The packing assembly is held together by a plurality of pins, each of which extends through aligned openings in the packing rings and into blind bores in the retainer rings on both sides of the packing rings.

The surface of a retainer ring at each end of the sealing assembly which is to be exposed to fluid pressure in the annulus is of greater area than the surface contact area of the adjacent packing ring contacting the retainer ring because of the cross sectional area of the pin holes so that the force which is transmitted to the packing rings from a retainer ring is amplified and increases the packing and sealing effect of the packing rings.

BRIEF DESCRIPTION OF THE DRAWINGS

In the accompanying drawings which form a part of the specification and are to be read in conjunction therewith.

DETAILED DESCRIPTION OF THE PREFERRED EMBODIMENT

Figure 1:
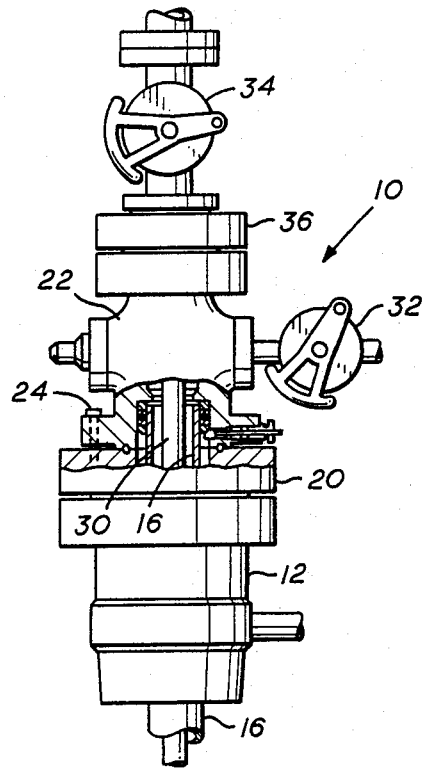
FIG. 1 is an elevational view, partly in section of a wellhead and christmas tree assembly which incorporates a seal assembly constructed in accordance with the invention.

Referring now to the drawings in greater detail and more particularly to FIG. 1, a wellhead and christmas tree assembly 10 is shown which includes a casing head 12 adapted to be secured to the top end of a surface casing (not shown) in coaxial relation thereto. A well casing string 16 is suspended from the casing head 12 by means of a slip assembly (not shown) which is mounted within the casing head.

An adapter flange 20 is shown mounted on top of the casing head 12 by bolts (not shown) or other means and a tubing head 22 is mounted atop the adapter flange 20 such that mating flanges of the adapter flange 20 and tubing head may be secured by bolts 24 or the like. A tubing string 30 is suspended from the tubing hanger and extends coaxially within the casing 16. A valve 32 mounted to a side outlet on the tubing head 22 is adapted to control the flow of fluid from the annular space between the tubing 30 and the well casing 16.

A lower master valve 34, mounted atop a second adapter flange 36 secured atop the tubing head 22, controls flow from the tubing 30. An upper master valve and the remainder of a conventional christmas tree (not shown) are then mounted above the valve 30.

In accordance with the present invention, an improved wellhead crossover seal assembly 40 is provided for sealing between the tubing head 22 and the upper end portion of the well casing 16 extending upwards into the central bore 46 of the tubing head. The purpose of the crossover seal is to isolate the high pressure fluids existing within the tubing head 22 between the well casing 16 and the central bore 46. In this manner, the portions of the wellhead below the tubing head 22 may be rated at lower pressure ratings thereby developing substantial cost savings to the well operator.

Figure 2:
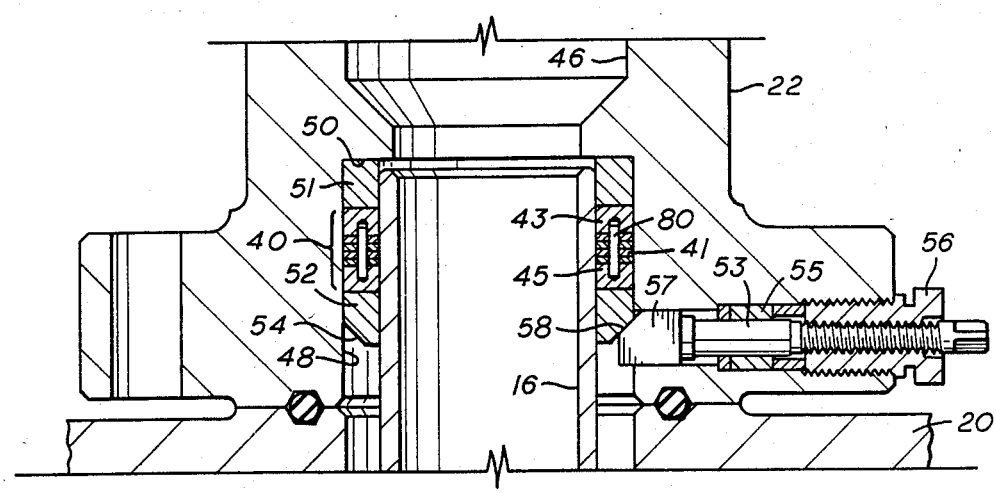
FIG. 2 is an enlarged fragmentary section of the wellhead of FIG. 1 with the tubing string omitted for purposes of clarity and showing the seal assembly activated by means of holddown screws.

Referring particularly to FIG. 2, wherein the present invention is illustrated in enlarged radial cross section, the crossover seal assembly 40 is shown in pre-loaded energized position between the casing 16 and tubing head 22. The central bore 46 of the tubing head includes an enlarged diameter portion extending to the lower end of the tubing head and defined by the cylindrical bore surface 48 which is bounded at its upper end by the downward facing annular shoulder 50.

The crossover seal assembly 40 includes primarily a plurality of packing rings 41 which are arranged against one another in a stack and are sandwiched between a pair of hard metal packing retainer rings 43 and 45. The packing rings 41 may be formed of any suitable material but are preferably a polymeric substance such as TEFLON or a similar material which have desirable sealing properties and are able to intimately contact the exterior wall of the casing 16 and the bore wall 48 of the tubing head to effect a seal even where there has been galling or other surface damage.

As installed in the tubing head 22, a pair of adapter rings 51 and 52 are provided for the seal assembly 40. The retainer ring 43 is the uppermost retainer ring and its upper surface is disposed in abutting engagement with the lower surface of the upper adapter ring 51, the upper end of which abuts the annular shoulder 50 in the tubing head bore. The lower retainer ring 45 is supported by the lower adapter ring 52 which in turn is supported by a plurality of holddown screws, such as the screw 53.

The lower outer corner of the adapter ring 52 is bevelled to provide a frusto-conical surface 54 adapted to be disposed in camming engagement with the contact noses of the supporting holddown screws. While only one holddown screw 53 is shown in FIG. 2, it is to be understood that a plurality of such screws are employed and are arranged in radial array about the casing 16. Such holddown screws typically include a packing 55, a packing gland nut 56 for energizing the packing, and a contact nose 57 which is provided with a camming surface 58 adapted to cooperatively engage the frusto-conical surface 54 of the lower adapter ring 52.

By threadedly moving the holddown screws inward, the contact noses thereof cammingly engage the lower adapter ring 52 to apply a compressive force to the seal assembly 40 which pre-loads the assembly.

At its lower end surface which confronts the uppermost packing ring 41, the retainer ring 43 has a bevelled surface 60 defining the lower end of its inner peripheral surface, as best shown in FIG. 30. The bevelled surface 60 presents a cam surface on the inner edge or corner of the retainer ring 43 which engages a hard metal chamfer ring 46. The chamfer ring 46 is positioned between the bevelled surface 60 and the adjacent packing ring 41 and is provided with a triangular radial cross section and a chamfer 47 which mates with and cams against the surface 60.

The outer diameter of the retainer ring 43 is also bevelled to provide a bevelled edge surface 61 or corner confronting the adjacent packing ring 41. Another hard metal chamfer ring 62, also triangular in section, has a chamfer 63 which mates with and cams against the bevelled surface 61. The chamfer ring 62 is located between the bevelled surface 61 and the adjacent packing ring 41 in contact at its outer surface with the adjacent cylindrical surface 48 of the tubing head bore. The inside surface of chamfer ring 46 contacts the casing 16 to assist in providing a seal there against.

The upper surface of the lower retainer ring 45 which confronts the lowermost packing ring 41 is shaped similarly to the corresponding lower surface of the retainer ring 43. The inner periphery of the retainer ring 45 has a bevelled surface 71, defining an inner corner or edge thereof. A hard metal chamfer ring 72 which is identical to chamfer ring 46 in size and shape is fitted against bevelled surface 71 between retainer ring 45 and the adjacent packing ring 41. Chamfer ring 72 has a chamfer 73 which mates with bevelled surface 71 while the inside cylindrical surface of chamfer ring 72 engages the casing 16.

The outside diameter surface of the retainer ring 45 has a bevelled surface 76 on the upper corner or edge thereof which confronts the adjacent packing ring 41. A hard metal chamfer ring 77 identical to chamfer ring 62 is located against the bevelled surface 76 and between the retainer ring 45 and the adjacent packing ring 41. The chamfer ring 77 has a chamfer 78 which mates with and cams against the bevelled surface 76. The outer cylindrical surface of the chamfer ring 77 engages the cylindrical surface of the tubing head bore.

Figure 3:
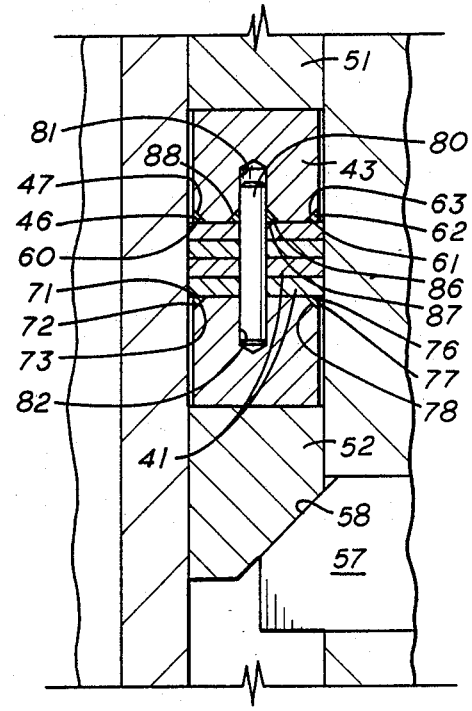
FIG. 3 is a further enlarged fragmentary view showing a radial cross-section of the seal assembly of FIG. 2.

As shown in FIGS. 2 and 3, the seal assembly 40 is held together by a series of hard metal pins 80 which are closely received in aligned openings formed through each of the packing rings 41 and into blind bores 81 and 82 which are formed in retainer rings 43 and 45, respectively. The blind bores 81 extend from the lower surface of retainer ring 43 and the blind bores 82 extend from the upper surface of the lower retainer ring 45. It is to be noted the blind ends of the bores 81, 82 are defined by conical surfaces and the axial length of each pin 80 is less than the combined axial length of the openings through the packing rings and the bores in which it is received. Preferably, the plurality of pins 80 are spaced equidistantly around the seal assembly 40. It is also preferred that the pins 80 be press fit into one of the blind bores, such as the bore 82 in the lower retainer ring 45, although such is not required. In such instance, the circular edge around the opening of each bore 81 which receives the pin 80 closely but loosely therein, is bevelled to provide a frusto-conical camming surface 86 about the pin 80.

Positioned against each bevelled surface 86 and located between the retainer ring 43 and the uppermost packing ring 41 is an annular hard metal gasket 87 having a chamfer 88 which mates with and cams against the adjacent bevelled surface 86. Each gasket 87 is triangular in radial cross section and has an inner cylindrical surface which closely contacts the corresponding pin 80. Preferably, all of the aforementioned bevelled surfaces and chamfers are at approximately 45 degrees with respect to the axis of the casing 16 and tubing head 22.

With a pre-loading applied by the holddown screws 53, there is a compression or squeezing of the parking rings 41 which urges their radial expansion to cause them to press firmly against the casing 16 on their inside diameters and against the tubing head 22 at their outside diameters in order to effect a seal. However, with fluid pressure in the annulus between the casing 16 and the bore wall of the tubing head, there is additional force which assists in further compression of the packing rings 41 so that they are pressure energized. Compression of retainer rings 43 and 45 toward one another also causes camming interaction between the surfaces 60 and 47 and between surfaces 71 and 73. Due to the incline of these bevelled surfaces and chamfers relative to the axis of the casing the chamfer rings 46 and 72 are pressed inwardly toward the casing 16 such that the inside cylindrical surfaces of the chamfer rings are firmly pressed against the outer surface of the casing 16 to substantially prevent extrusion of the packing rings 41 between the casing and the hard metal chamfer rings which also asssist in providing a seal against the casing. The same effect occurs at the outer diameter of packing rings 41 due to the chamfer rings 62 and 77. Under axial compression, the interaction between surfaces 61 and 63 and between surfaces 76 and 78 cams the chamfer rings 62 and 77 outwardly such that their outside cylindrical surfaces are pressed firmly against the adjacent cylindrical bore surface 48 of the tubing head 22. The outer chamfer rings 62, 77 thus prevent extrusion of the packing rings 41 between the tubing head and the chamfer rings, while they also assist in sealing against the tubing head.

Also, when the retainer rings 43 and 45 are pressed towards one another by fluid pressure, surfaces 86 and 88 are pressed against one another to force the gaskets 87 inwardly against the pins 80 due to the inclined angle of the cam surfaces. As a consequence, the gasket rings 87 firmly engage the pins 80 to prevent extrusion of the packing rings 41 between the pins and gaskets.

It will thus be seen that increased fluid pressure causes increased compression of retainer rings 43 and 45 and packing rings 41, thereby increasing the sealing effect of the packing in order to counteract the increased fluid pressure. In addition, the susceptibility of the packing rings to extrusion does not increase with increased fluid pressure in the tubing head annulus.

Due to the presence of the openings which are formed through the packing rings to receive pins 80, the surface of the lowermost packing ring which is exposed to the lower retainer ring 45 is smaller than the area of the bottom annular surface of the retainer ring which is exposed to fluid pressure. Consequently, the force per unit area which is applied to the packing rings 41 is greater than the force per unit area which is applied to retainer ring 45. Although the same force which is applied to retainer ring 45 is applied to the packing rings 41, the surface of the packing rings which is exposed to the force has less area than the bottom area of the retainer ring 45. Therefore, the force per unit area which is transmitted to the packing rings 41 is amplified and increases the compression and sealing effect of the packing rings.

In certain instances, the fluid pressure in the casing 16 and tubing head 22 may exceed the fluid pressure in the annulus between the casing 16 and tubing head bore 48. In that event, the compesive force acts in an axially downward direction as seen in FIG. 2. Accordingly, the force per unit unit area which is applied to the packing rings 41 is greater than the force per unit area which is applied to retainer ring 43 because the surface of the uppermost packing ring exposed to the upper retainer ring 34 is smaller than the area of the top annular surface of the retainer ring 43 exposed to fluid pressure, due to the area of the openings for the pins 80.

It will therefore be seen that the "unsupported area" seal of this invention is bi-directional. While it has been illustrated herein as a crossover seal for wellhead applications, it could be used in other applications such as a spool valve or deep-sea applications where the fluid pressure which acts on the seal assebmly may be applied from either axial direction.

It is also to be understood that the foregoing description of a preferred embodiment of the invention has been presented for purposes of illustration and description and is not intended to limit the invention to the precise form disclosed. For example, the hard metal anti-extrusion rings may be eliminated altogether in low pressure applications or they might be replaced by some other anti-extrusion means. The adapter rings might also be eliminated for certain installations wherein there may also be no need for pre-loading and holddown screws. In applications such as spool valves, holddown screws would be inappropriate. It is to appreciated therefore that changes may be made by those skilled in the art without departing from the spirit of the invention.

What is claimed is:

1. A packing assembly for sealing an annulus between spaced inner and outer cylindrical surfaces arranged in concentric coaxial relationship with the outer cylindrical surface having an inwardly extending annular shoulder, the packing assembly being positioned within the annulus and comprising:

a plurality of packing rings in said annular space arranged in contiguous stacked relation with one another and disposed about the inner cylindrical surface in contact therewith for effecting a seal between said spaced inner and outer cylindrical surfaces:

a pair of retainer rings between which said packing rings are located, each retainer ring being disposed in sleeved relation about said inner cylindrical surface, with one said retainer ring being restrained in one direction of axial movement by said annular shoulder and each retainer ring has an annular end surface remote from said packing rings upon which fluid pressure in the annulus is adapted to act in an axial direction to urge the retainer rings towards one another and thereby compress and squeeze the packing rings against said inner and outer cylindrical surfaces to increase the sealing effect of the packing rings and wherein the surface of each retainer ring at the ends of the packing assembly exceeds the surface area of the adjacent packing ring contacting therewith whereby the force per unit area transmitted by a retainer ring to the packing rings upon application of fluid pressure from either axial direction is amplified to increase the sealing effect of the packing rings as the fluid pressure acting on the sealing assembly increases.

2. A packing assembly as set forth in claim 1 wherein the retainer rings are provided with aligned blind bores and the packing elements are provided with openings aligned with said blind bores to provide a continuous chamber therewith; and a plurality of pins, each disposed in an aligned set of said openings and blind bores.

3. A packing assembly as set forth in claim 2 wherein means are provided for applying a pre-load axial force to said packing assembly sufficient to effect a seal of the annulus.

4. A packing assembly as set forth in claim 2 wherein the axial length of each of said pins is less than the axial length of the combined aligned lengths of the aligned openings and bores in which it is received.

* * * * *